(12) United States Patent
Yang et al.

(10) Patent No.: US 9,016,969 B2
(45) Date of Patent: Apr. 28, 2015

(54) COUPLING STRUCTURE BETWEEN SHIFT LEVER AND KNOB FOR VEHICLE

(71) Applicants: Hyundai Motor Company, Seoul (KR); Dongwon Industrial Co., Ltd., Ansan Gyeonggi-Do (KR)

(72) Inventors: Hee-Soo Yang, Gyeonggi-do (KR); Jee-Hyuck Choi, Gyeonggi-do (KR); Yang-Rae Cho, Gyeonggi-do (KR); Yeon-Su Kim, Gyeonggi-do (KR)

(73) Assignees: Hyundai Motor Company, Seoul (KR); Dongwon Industrial Co., Ltd., Ansan, Gyeonggi-do (KR)

( * ) Notice: Subject to any disclaimer, the term of this patent is extended or adjusted under 35 U.S.C. 154(b) by 65 days.

(21) Appl. No.: 13/904,378

(22) Filed: May 29, 2013

(65) Prior Publication Data

US 2013/0322961 A1 Dec. 5, 2013

(30) Foreign Application Priority Data

Jun. 5, 2012 (KR) .................. 10-2012-0060356

(51) Int. Cl.
| | |
|---|---|
| *F16B 7/10* | (2006.01) |
| *F16B 3/04* | (2006.01) |
| *F16H 59/02* | (2006.01) |
| *G05G 1/06* | (2006.01) |
| *F16B 21/06* | (2006.01) |
| *F16B 21/07* | (2006.01) |
| *F16B 21/16* | (2006.01) |

(52) U.S. Cl.
CPC ............ *F16B 3/04* (2013.01); *Y10T 403/7026* (2015.01); *F16H 59/0278* (2013.01); *F16B 21/065* (2013.01); *F16B 21/075* (2013.01); *F16B 21/16* (2013.01); *G05G 1/06* (2013.01)

(58) Field of Classification Search
USPC ............ 403/109.1–109.3, 329; 74/473.3, 548
See application file for complete search history.

(56) References Cited

U.S. PATENT DOCUMENTS

| | | | | |
|---|---|---|---|---|
| 5,588,329 | A | * | 12/1996 | Nedachi .................... 74/473.36 |
| 8,312,787 | B2 | * | 11/2012 | Na et al. ...................... 74/473.3 |
| 2007/0137359 | A1 | * | 6/2007 | Ohno et al. .................. 74/473.3 |
| 2011/0126656 | A1 | * | 6/2011 | Na et al. ....................... 74/473.3 |

FOREIGN PATENT DOCUMENTS

| | | |
|---|---|---|
| JP | 08-272471 A | 10/1996 |
| JP | 2001-150972 A | 6/2001 |
| JP | 2003-112534 A | 4/2003 |
| JP | 2009-280052 A | 12/2009 |
| KR | 10-0521532 B1 | 10/2005 |

(Continued)

*Primary Examiner* — Victor MacArthur
(74) *Attorney, Agent, or Firm* — Mintz Levin Cohn Ferris Glovsky and Popeo, P.C.; Peter F. Corless

(57) ABSTRACT

A coupling structure between a shift lever and a knob for a vehicle that includes an insert which is formed at a center thereof with an insert aperture and fixed within a knob, and of which a lower end is formed to protrude from the knob to the exterior. A shift lever rod is inserted into and coupled to the insert aperture and a skirt is formed to enclose outer peripheral surfaces of the shift lever rod and the insert. In addition, a plurality of elastic members are formed along the outer peripheral surface of the insert to protrude radially outward toward the knob by a predetermined angle and are formed to be elastically deformed and opened radially outward when the shift lever rod is coupled to the knob.

6 Claims, 12 Drawing Sheets

(56) References Cited

FOREIGN PATENT DOCUMENTS

| | | |
|---|---|---|
| KR | 10-2005-0109238 A | 11/2005 |
| KR | 10-2006-0089035 A | 8/2006 |
| KR | 10-2007-0105547 A | 10/2007 |
| KR | 10-2009-0030747 A | 3/2009 |
| KR | 10-2010-0009165 A | 1/2010 |

* cited by examiner

COUPLING STRUCTURE BETWEEN SHIFT LEVER AND KNOB FOR VEHICLE

CROSS-REFERENCE(S) TO RELATED APPLICATIONS

This application claims priority to Korean Patent Application No(s). 10-2012-0060356, filed on Jun. 5, 2012, which is incorporated herein by reference in its entirety.

BACKGROUND

1. Field of the Invention

Exemplary embodiments of the present invention relate to a coupling structure between a shift lever and a transmission knob for a vehicle; and, more particularly, to a coupling structure between a shift lever and a knob for a vehicle capable of being easily coupled in a one-touch manner during assembly work.

2. Description of Related Art

In general, a speed change in a vehicle mounted with a transmission is completed when a driver selects a shift lever placed at one side of a driver seat to a neutral position between first and second gears, between third and fourth gears, or between fifth and reverse gears by moving the shift lever in a width direction of the vehicle, and then shifts the shift lever in a forward and backward direction of the vehicle again to change speed, a selecting cable and a shifting cable, which are connected to a lower end of the shift lever, operate a shift control mechanism arranged within the transmission when interlocked with each other.

The shift lever is coupled, at an upper end thereof, with a shift knob which is shaped to be easily grasped by a driver. In the prior art, the shift knob and the shift lever are mutually coupled in a screwing manner by forming a male threaded portion on the upper end of the shift lever and forming a female threaded portion corresponding to the male threaded portion on an inner diameter portion of the shift knob.

In addition, the male threaded portion of the shift lever is formed, at a lower side thereof, with an inclined surface that has a particular taper angle, and the female threaded portion of the shift knob is formed, at a lower side thereof, with an inclined surface having a particular taper angle. Accordingly, a substantially strong fastening force by the taper angle exists when fastening the shift lever and the shift knob.

However, in the above-mentioned screwing manner, since each of the male threaded portion and the female threaded portion usually has 12 and 13 pitches, the knob must be turned at least 12 times to couple the knob to the shift lever.

Meanwhile, a method of forcedly pressing and fastening a pre-assembled knob to a shift lever has been developed using an elastic clip and also a method of fastening a knob to a shift lever and then fixing them using snap ring, in addition to the above-mentioned screwing manner.

However, even in a case of applying the above-mentioned improved method, there are problems in that workability is deteriorated since an excessive press force is required to fasten the knob to the shift lever, and damage of the knob may occur due to use of a tool such as a rubber hammer to minimize a fatigue degree of a worker.

SUMMARY

An embodiment of the present invention provides a coupling structure between a shift lever and a knob for a vehicle, which reduces an excessive press force generated when fastening a knob to a shift lever.

Another embodiment of the present invention provides a coupling structure between a shift lever and a knob for a vehicle, which facilitates a coupling and decoupling of a shift lever and a knob.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a coupling structure between a shift lever and a knob for a vehicle may include an insert formed at a center thereof with an insert aperture and fixed within a knob, and of which a lower end protrudes from the knob to the exterior, a shift lever rod inserted into and coupled to the insert aperture, a skirt formed to enclose outer peripheral surfaces of the shift lever rod and the insert, and a plurality of elastic members formed along the outer peripheral surface of the insert to protrude radially outward toward the knob by a predetermined angle, and formed to be elastically deformed and opened radially outward when the shift lever rod is coupled to the shift knob.

The plurality of elastic members may include a pair of first elastic bars formed to face each other and may be formed with inner side protrusions directed radially inward from respective end portions of the first elastic bars, and respective opposite sides of the inner side protrusions may be formed with pressing protrusions which protrude radially outward. The plurality of elastic members may further include another pair of second elastic bars formed to face each other and may be formed with catching protrusions which protrude radially outward from respective end portions of the second elastic bars.

The shift lever rod may have rod catching grooves formed on the outer peripheral surface thereof, and which correspond and are coupled to the inner side protrusions. The skirt may be formed, on an inner peripheral surface thereof, with catching grooves which correspond and are coupled to the catching protrusions. Inclined surfaces may be formed to extend from each of the catching grooves to both sides thereof along a rotation direction of the skirt, and the catching protrusion coupled to the catching groove may be decoupled from the catching groove while sliding along the inclined surfaces when the skirt rotates about a center axis thereof. Further, a lower end of the skirt may be formed with a stepped portion extending radially inward. In addition, a hook may be formed from the stepped portion toward the skirt and an inner peripheral surface of the insert may be formed with a hook catching groove that corresponds to the hook.

DETAILED DESCRIPTION

Figure 1:
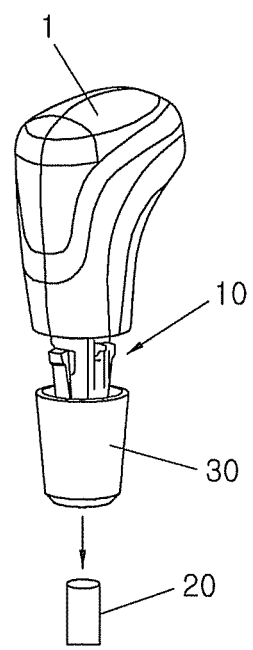
FIG. 1 is an exemplary detailed view illustrating a coupling structure between a shift lever and a knob for a vehicle in accordance with an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is an exemplary detailed view illustrating a coupling structure between a shift lever and a knob for a vehicle in accordance with an exemplary embodiment of the present invention. As shown in FIG. 1, a coupling structure between a shift lever and a knob for a vehicle may include a knob 1, an insert 10, a shift lever rod 20, a skirt 30, and a plurality of elastic members 11 and 12.

The knob 1 may be shaped to be grasped and enclosed by a driver's hand. Furthermore, the insert 10 may be fixed within the knob 1, and a center of the insert 10 may have a space into which one end of the shift lever rod 20 is inserted to be coupled. In addition, although not shown, the other end of the shift lever rod 20 may be coupled to a transmission portion and may change shift stages in response to a shift lever operation of a driver.

The insert 10 may be coupled to be fixed within the knob 1 and the center of the insert 10 may have a cylindrical space through which the shift lever rod 20 passes. In addition, the plural elastic members 11 and 12 may be formed along an outer peripheral surface of the insert 10 to protrude radially outward toward the knob 1 by a predetermined angle. Specifically, each of the elastic members 11 and 12 may be formed to be elastically deformed and opened radially outward when the shift lever rod 20 is coupled via a receiving groove of the insert 10. That is, each of the elastic members 11 and 12 may be made of a plastic material that has a resilient force.

Figure 2:
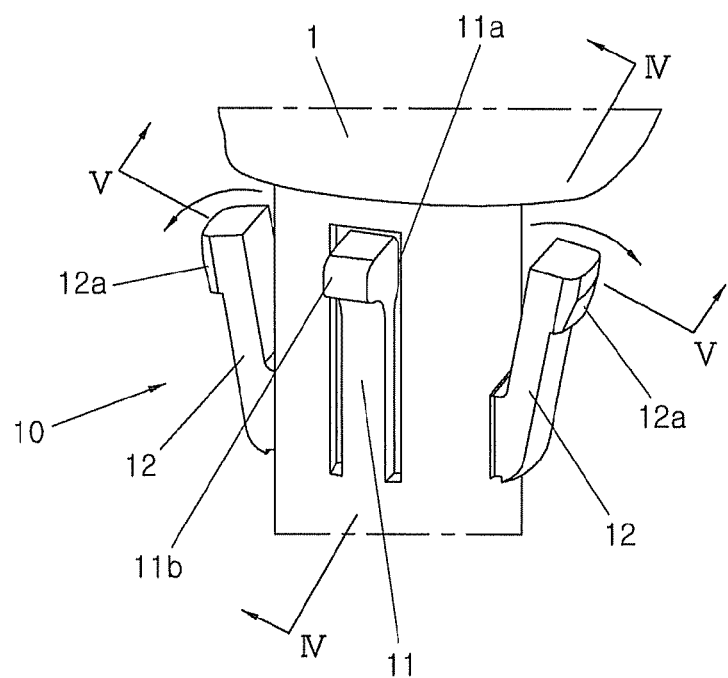
FIG. 2 is an exemplary view illustrating an insert applied to the coupling structure between a shift lever and a knob for a vehicle in accordance with the exemplary embodiment of the present invention.
Figure 3:
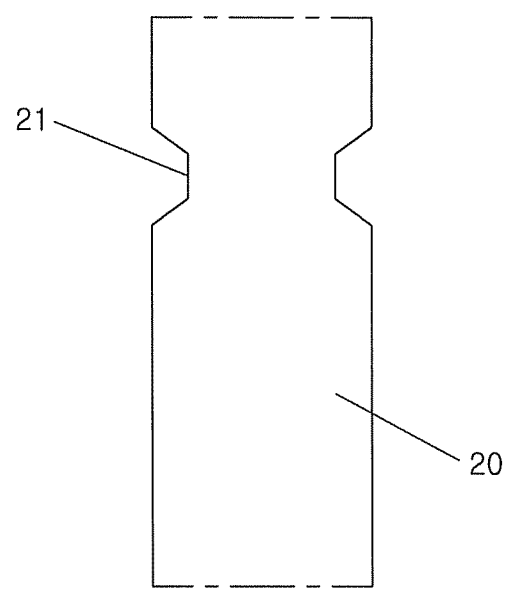
FIG. 3 is an exemplary cross-sectional view illustrating a shift lever rod applied to the coupling structure between a shift lever and a knob for a vehicle in accordance with the exemplary embodiment of the present invention.
Figure 4:
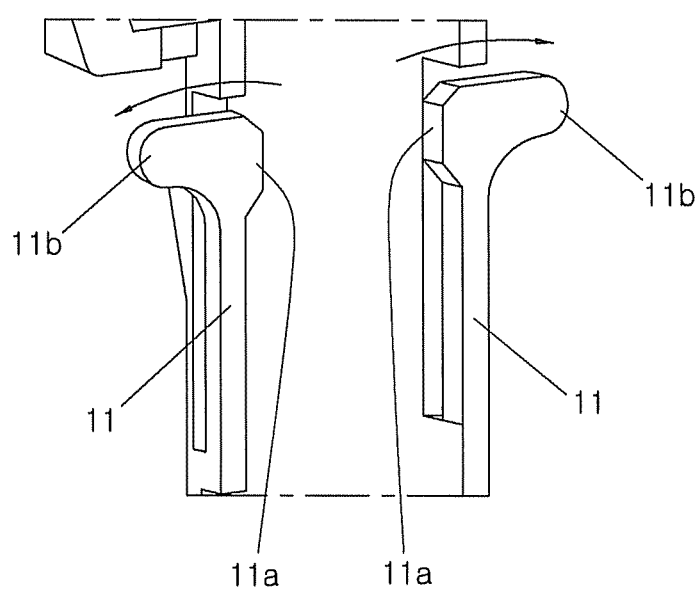
FIG. 4 is an exemplary cross-sectional view taken along line IV-IV of FIG. 2 in accordance with the exemplary embodiment of the present invention.
Figure 5:
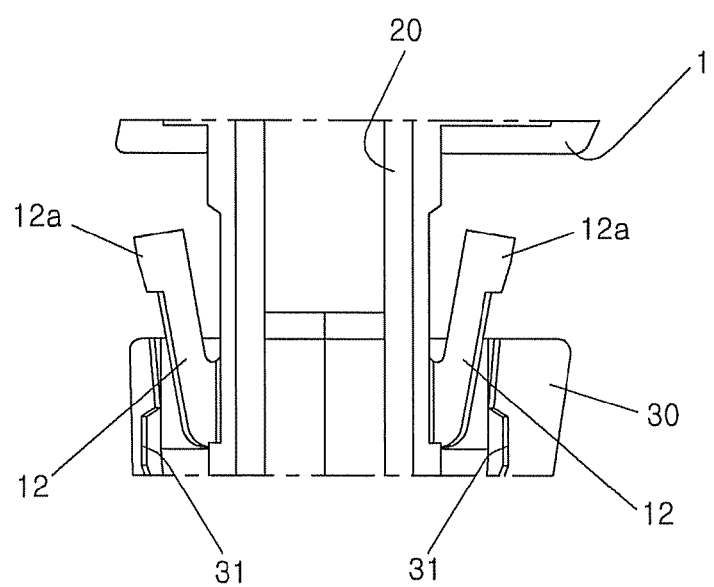
FIG. 5 is an exemplary cross-sectional view taken along line V-V of FIG. 2 in accordance with the exemplary embodiment of the present invention.

FIG. 2 is an exemplary view illustrating the insert applied to the coupling structure between a shift lever and a knob for a vehicle in accordance with the exemplary embodiment of the present invention. FIG. 3 is an exemplary cross-sectional view illustrating the shift lever rod applied to the coupling structure between a shift lever and a knob for a vehicle in accordance with the exemplary embodiment of the present invention. FIG. 4 is an exemplary cross-sectional view taken along line IV-IV of FIG. 2. FIG. 5 is an exemplary cross-sectional view taken along line V-V of FIG. 2.

As shown in FIG. 2, the elastic members 11 and 12 may include first elastic bars 11 and second elastic bars 12 which are formed integrally with the outer peripheral surface of the insert 10. Specifically, at least four elastic members 11 and 12 may be formed to face a central axis of the insert 10. In particular, among the elastic members 11 and 12, a pair of first elastic bars 11 formed to face each other may be formed with inner side protrusions 11a directed radially inward from respective end portions of the first elastic bars 11, as shown in FIG. 4. In other words, the inner side protrusions 11a may correspond to and be coupled to rod catching grooves 21 formed on an outer peripheral surface of the shift lever rod 20, as shown in FIG. 3. In particular, respective opposite surfaces of the inner side protrusions 11a may be formed with pressing protrusions 11b which protrude in a direction opposite to the inner side protrusions 11a. In other words, the pressing protrusions 11b may be formed to be pressed radially inward by an inner peripheral surface of the skirt 30 to be described later.

In addition, among the elastic members 11 and 12, another pair of second elastic bars 12 formed to face each other may be formed with catching protrusions 12a which protrude radially outward from respective end portions of the second elastic bars 12, as shown in FIG. 5. In other words, the second elastic bars 12 may have the catching protrusions 12a which are formed to protrude radially outward. The catching protrusions 12a may correspond to and be coupled to respective catching grooves 31 formed on the inner peripheral surface of the skirt 30.

Hereinafter, an operation of the above-mentioned coupling structure between a shift lever and a knob for a vehicle will be described.

Figure 6:
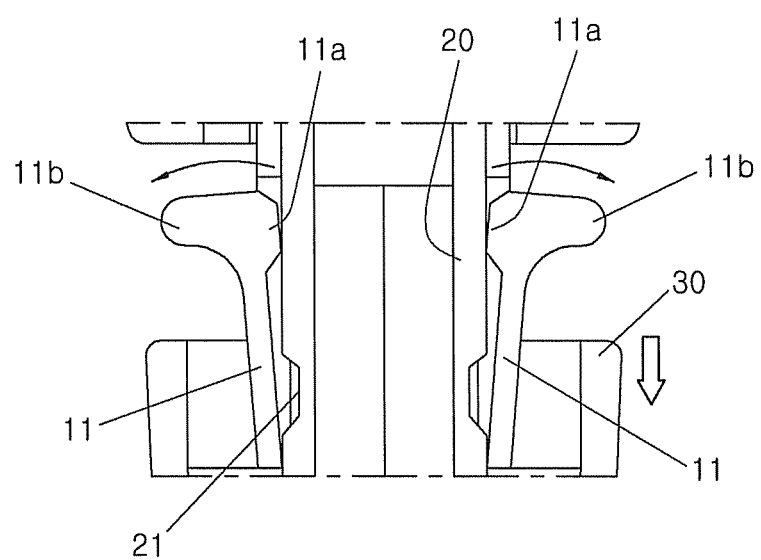
FIG. 6 is an exemplary view illustrating a coupling state of the insert and elastic members applied to the coupling structure between a shift lever and a knob for a vehicle in accordance with the exemplary embodiment of the present invention.

FIG. 6 is an exemplary view illustrating a coupling state of the insert and the elastic members applied to the coupling structure between a shift lever and a knob for a vehicle in accordance with the exemplary embodiment of the present invention. As shown in FIG. 6, when the knob 1 descends by a press force of a worker, the shift lever rod 20 ascends along the inner peripheral surface of the insert 10.

Figure 7:
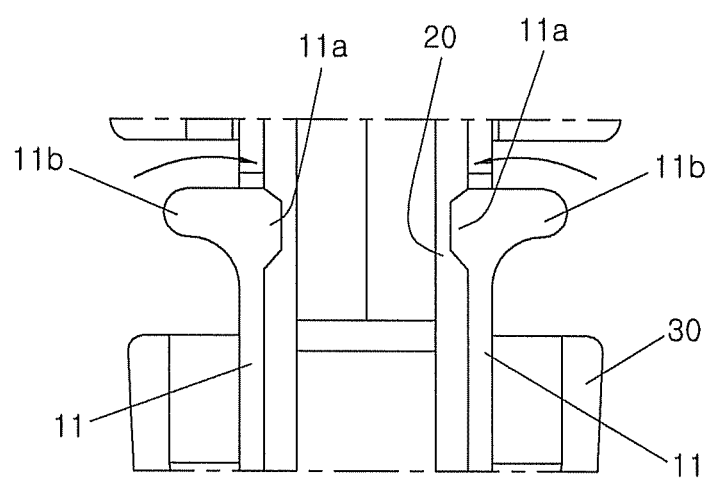
FIG. 7 is an exemplary view illustrating an inner side protrusion of the insert coupled with rod catching grooves of the shift lever rod applied to the coupling structure between a shift lever and a knob for a vehicle in accordance with the exemplary embodiment of the present invention.

FIG. 7 is an exemplary view illustrating the inner side protrusions of the insert coupled with the rod catching grooves of the shift lever rod applied to the coupling structure between a shift lever and a knob for a vehicle in accordance with the exemplary embodiment of the present invention. Subsequently, the first elastic bars 11 may be elastically deformed toward the shift lever rod 20 and the inner side protrusions 11a may be simultaneously coupled to the rod catching grooves 21, as shown in FIG. 7.

Figure 8:
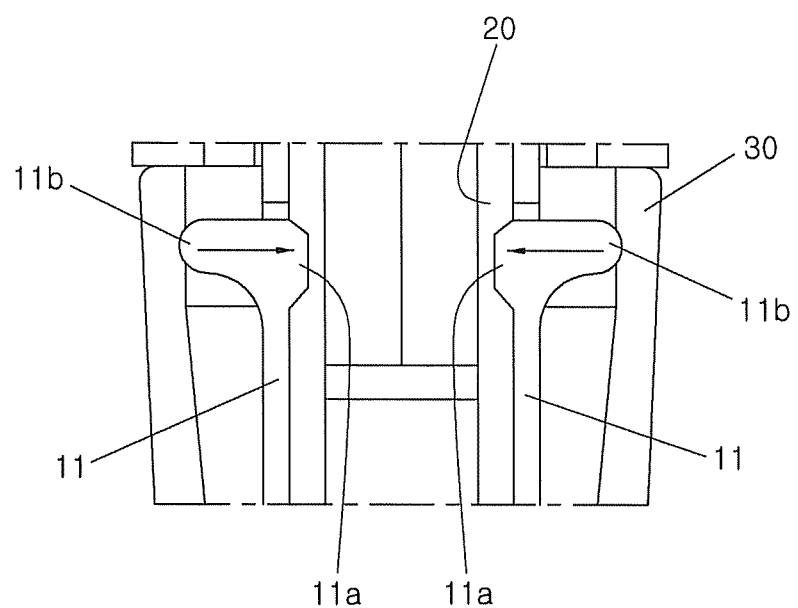
FIG. 8 is an exemplary view illustrating pressing protrusions pressed radially inward by an inner peripheral surface of the insert applied to the coupling structure between a shift lever and a knob for a vehicle in accordance with the exemplary embodiment of the present invention.

FIG. 8 is an exemplary view illustrating the pressing protrusions pressed radially inward by the inner peripheral surface of the insert applied to the coupling structure between a shift lever and a knob for a vehicle in accordance with the exemplary embodiment of the present invention. When the worker grasps and upwardly moves the skirt 30 disposed to enclose the outer peripheral surface of the insert 10, the pressing protrusions 1 lb may be pressed radially inward by the inner peripheral surface of the skirt 30. Therefore, the coupling of the inner side protrusions 11a and the rod catching grooves 21 may be more securely maintained.

Figure 9:
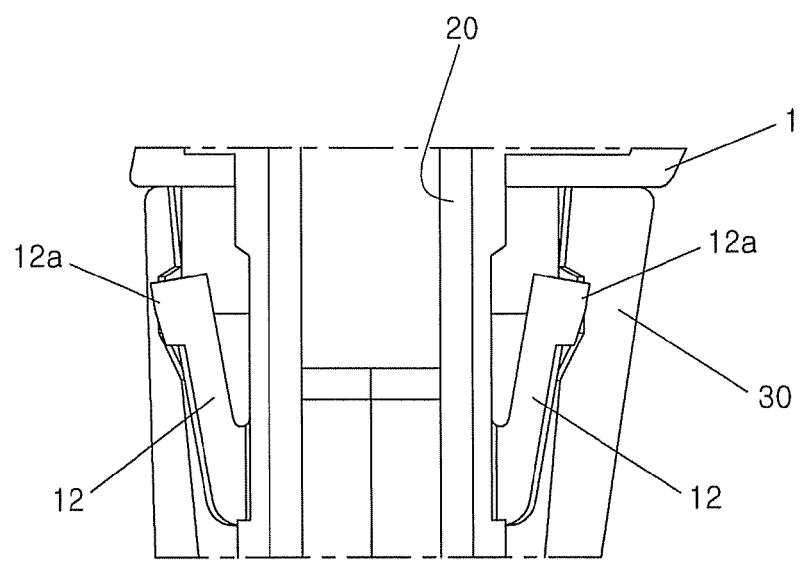
FIG. 9 is an exemplary view illustrating catching protrusions of the elastic members coupled to catching grooves of a skirt applied to the coupling structure between a shift lever and a knob for a vehicle in accordance with the exemplary embodiment of the present invention.

FIG. 9 is an exemplary cross-sectional view illustrating the catching protrusions of the elastic members coupled to the catching grooves of the skirt applied to the coupling structure between a shift lever and a knob for a vehicle in accordance with the exemplary embodiment of the present invention. In particular, among the elastic members 11 and 12, the pair of elastic member 12, which are formed with the catching protrusions 12a protruding radially outward, may be coupled with the catching grooves 31 formed on the inner peripheral surface of the skirt 30, as shown in FIG. 9. Thus, the insert 10 and the skirt 30 may be fixed to not move relative to each other.

Figure 10:
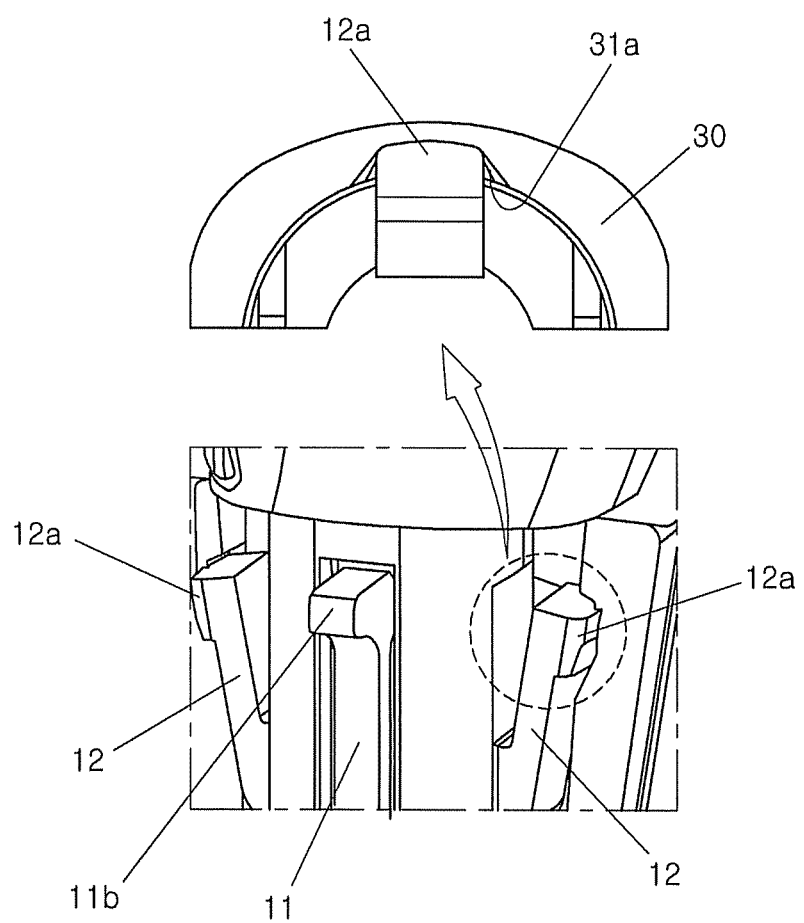
FIG. 10 is an exemplary view illustrating the catching protrusions coupled to the catching grooves during rotation of the skirt applied to the coupling structure between a shift lever and a knob for a vehicle in accordance with the exemplary embodiment of the present invention.
Figure 11:
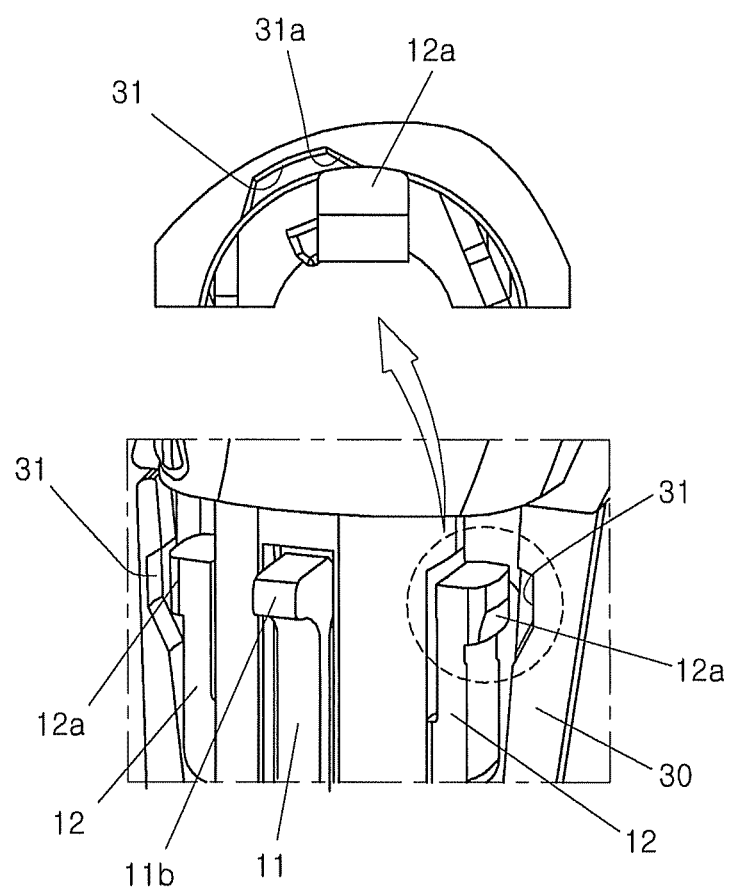
FIG. 11 is an exemplary view illustrating the catching protrusions decoupled from the catching grooves during the rotation of the skirt applied to the coupling structure between a shift lever and a knob for a vehicle in accordance with the exemplary embodiment of the present invention.

FIG. 10 is an exemplary view illustrating the catching protrusions coupled to the catching grooves during rotation of the skirt applied to the coupling structure between a shift lever and a knob for a vehicle in accordance with the exemplary embodiment of the present invention. FIG. 11 is an exemplary view illustrating the catching protrusions decoupled from the catching grooves during the rotation of the skirt. As shown in FIG. 10, when the skirt 30 moves upward, the catching protrusions 12a of the elastic members 12 may be coupled to the catching grooves 31 of the skirt 30. Consequently, the skirt 30 may be completely coupled with the insert 10 and the shift lever rod 20. As shown in FIG. 11, decoupling the insert 10 and the shift lever rod 20 from the skirt 30 may be performed when a worker rotates the skirt 30 in one direction, causing each of the second elastic bars 12 of the elastic members 11 and 12 to be elastically deformed by inclined surfaces 31a which are formed to extend to both sides of the associated catching groove 31 of the skirt, namely, to both sides of the skirt 30 with respect to both rotation directions thereof, and simultaneously each caching protrusion 12a may slide along the inclined surfaces 31a to be decoupled from the catching groove 31. As such, since the skirt 30 may freely move downward when the catching protrusions 12a are decoupled from the catching grooves 31, the skirt 30 may be easily decoupled from the insert 10.

Figure 12:
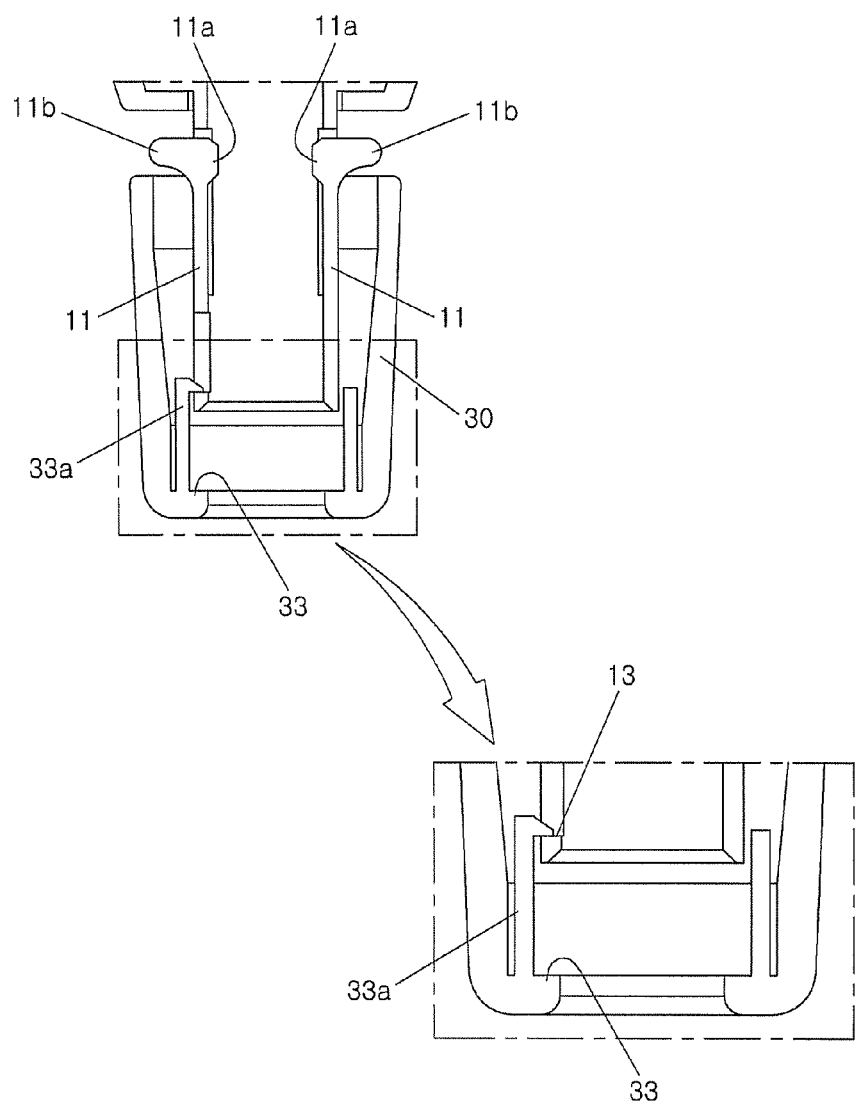
FIG. 12 is an exemplary cross-sectional view illustrating the skirt applied to the coupling structure between a shift lever and a knob for a vehicle in accordance with the exemplary embodiment of the present invention.

FIG. 12 is an exemplary cross-sectional view illustrating the skirt applied to the coupling structure between a shift lever and a knob for a vehicle in accordance with the exemplary embodiment of the present invention. As shown in FIG. 12, a lower end portion of the skirt 30 may be formed with a hook 33a to maintain the skirt 30 temporarily assembled with the insert 10 before being completely coupled to the knob 1. In other words, a lower end of the skirt 30 may be formed with a stepped portion 33 directed radially inward, and the hook 33a may be formed on the stepped portion 33 to protrude toward the insert 10. In particular, a lower end portion of the insert 10 may be formed with a hook catching groove 13 to fix an end portion of the hook 33a to the hook catching groove 13. That is, the skirt 30 and the insert 10 may be maintained in a pre-assembled state. Accordingly, since a worker may rapidly and completely assemble the skirt 30 and the insert 10 which may be pre-assembled in an assembly process of the skirt 30 and the inset 10, workability may be enhanced.

In accordance with a coupling structure between a shift lever and a knob for a vehicle according to the exemplary embodiments of the present invention, it may be possible to enhance durability and productivity by minimizing an excessive press force generated during fastening of a knob to a shift lever. In addition, since the shift lever and the knob are easily coupled, it may be possible to minimize a fatigue degree of a worker and facilitate maintenance of the shift lever and the knob.

While the present invention has been described with respect to the specific exemplary embodiments, it will be apparent to those skilled in the art that various changes and modifications may be made without departing from the spirit and scope of the invention as defined in the following claims.

What is claimed is:

1. A coupling structure between a shift lever and a knob for a vehicle, comprising:
   an insert formed at a center thereof with an insert aperture and fixed within the knob, wherein a lower end of the insert is formed to protrude from the knob to the exterior of the knob;
   a rod of the shift lever inserted into and coupled to the insert aperture;
   a skirt formed to enclose outer peripheral surfaces of the shift lever rod and the insert; and
   a plurality of elastic members formed along the outer peripheral surface of the insert to protrude radially outward toward the knob by a predetermined angle and formed to be elastically deformed and opened radially outward when the shift lever rod is coupled to the knob,
   wherein a lower end of skirt is for formed with:
      a stepped portion that extends radially inward;
      a hook formed from the stepped portion toward the skirt; and
      an inner peripheral surface of the insert formed with a hook catching groove that corresponds to the hook.

2. The coupling structure of claim 1, wherein the plurality of elastic members include:

a pair of first elastic bars formed to face each other and formed with inner side protrusions directed radially inward from respective end portions of the first elastic bars and respective opposite sides of the inner side protrusions are formed with pressing protrusions which protrude radially outward.

3. The coupling structure of claim 2, wherein the plurality of elastic members further include:

another pair of second elastic bars formed to face each other and formed with catching protrusions which protrude radially outward from respective end portions of the second elastic bars.

4. The coupling structure of claim 3, wherein the skirt is formed on an inner peripheral surface thereof with catching grooves which correspond and are coupled to the catching protrusions.

5. The coupling structure of claim 4, wherein inclined surfaces are formed to extend from each of the catching grooves to both sides thereof along a rotation direction of the skirt, and the catching protrusion coupled to the catching groove is decoupled from the catching groove while sliding along the inclined surfaces when the skirt rotates about a center axis thereof.

6. The coupling structure of claim 2, wherein the shift lever rod has rod catching grooves which are formed on the outer peripheral surface thereof and which correspond and are coupled to the inner side protrusions.

* * * * *